US007865668B2

(12) United States Patent
Gregg et al.

(10) Patent No.: US 7,865,668 B2
(45) Date of Patent: Jan. 4, 2011

(54) TWO-SIDED, DYNAMIC CACHE INJECTION CONTROL

(75) Inventors: Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/958,424

(22) Filed: Dec. 18, 2007

(65) Prior Publication Data
US 2009/0157961 A1 Jun. 18, 2009

(51) Int. Cl.
G06F 12/00 (2006.01)
(52) U.S. Cl. ................. 711/137; 711/126; 711/E12.017
(58) Field of Classification Search ................. 711/126, 711/137, E12.017
See application file for complete search history.

(56) References Cited

U.S. PATENT DOCUMENTS

| 6,711,651 | B1 * | 3/2004 | Moreno et al. ............... 711/141 |
| 7,058,936 | B2 | 6/2006 | Chilimbi et al. |
| 2004/0148473 | A1 * | 7/2004 | Hughes et al. ............... 711/144 |
| 2005/0246500 | A1 * | 11/2005 | Iyer et al. ................... 711/137 |
| 2006/0095679 | A1 | 5/2006 | Edirisooriya |
| 2006/0112238 | A1 * | 5/2006 | Jamil et al. ................. 711/145 |
| 2006/0136671 | A1 * | 6/2006 | Balakrishnan et al. ...... 711/122 |
| 2007/0088915 | A1 | 4/2007 | Archambault et al. |
| 2008/0059708 | A1 * | 3/2008 | Lawson et al. ............... 711/125 |

OTHER PUBLICATIONS

Leon et al., "Reducing the Impact of the MemoryWall for I/O Using Cache Injection," High-Performance Interconnects, 2007. HOTI 2007. 15th Annual IEEE Symposium, Sep. 4, 2007, pp. 143-15.*
Leon et al., Reducing Memory Bandwidth for Chip-Multiprocessors using Cache Injection, Computer Science Department, University of Mexico, 2006, http://www.usenix.org/events/osdi06/posters/leon. pdf, 1 page.

(Continued)

Primary Examiner—Shane M Thomas
(74) Attorney, Agent, or Firm—Cantor Colburn LLP; Steven Chiu (57) ABSTRACT

A method, system, and computer program product for two-sided, dynamic cache injection control are provided. An I/O adapter generates an I/O transaction in response to receiving a request for the transaction. The transaction includes an ID field and a requested address. The adapter looks up the address in a cache translation table stored thereon, which includes mappings between addresses and corresponding address space identifiers (ASIDs). The adapter enters an ASID in the ID field when the requested address is present in the cache translation table. IDs corresponding to device identifiers, address ranges and pattern strings may also be entered. The adapter sends the transaction to one of an I/O hub and system chipset, which in turn, looks up the ASID in a table stored thereon and injects the requested address and corresponding data in a processor complex when the ASID is present in the table, indicating that the address space corresponding to the ASID is actively running on a processor in the complex. The ASIDs are dynamically determined and set in the adapter during execution of an application in the processor complex.

20 Claims, 7 Drawing Sheets

OTHER PUBLICATIONS

Milenkovic et al., A Performance Evaluation of Cache Injection in Bus-based Shared Memory Multiprocessors, University of Alabama in Huntsville, 2002, http://www.ece.uah.edu/~milenka/docs/milenkovic_conc00.pdf, 12 pages.

Milenkovic, Achieving High Performance in Bus-Based Shared-Memory Multiprocessors, IEEE Concurrency, 2000, http://www.ece.uah.edu/~milenka/docs/milenkovic_conc00.pdf., pp. 36-44.

Regnier et al., TCP Onloading for Data Center Servers, Computer, IEEE Computer Society, 2004, http://download.intel.com/technology/comms/perfnet/download/tcp_ieee_article.pdf, pp. 46-56.

U.S. Appl. No. 11/958,418, filed Dec. 18, 2007.
U.S. Appl. No. 11/958,431, filed Dec. 18, 2007.
U.S. Appl. No. 11/958,435, filed Dec. 18, 2007.
U.S. Appl. No. 11/958,440, filed Dec. 18, 2007.
U.S. Appl. No. 11/958,445, filed Dec. 18, 2007.

* cited by examiner

TWO-SIDED, DYNAMIC CACHE INJECTION CONTROL

BACKGROUND OF THE INVENTION

The present disclosure relates generally to data processing and, in particular, to a method, system, and computer program product for two-sided, dynamic cache injection control.

Recently, direct cache access (also referred to as cache injection) schemes have been developed for eliminating costly memory read latency that results from updating invalidated cache lines from memory in a processor complex. For example, if an input/output (I/O) adapter writes a burst of data items to memory and some of these data items are cached in the processor complex, then cache injection strives to directly update cached copies in the processor complex.

Currently, cache injection schemes do not provide efficient management or controls in order to efficiently handle processor complex bandwidth. A processor complex needs interconnect bandwidth to and from the system chipset for operations such as processor pre-fetching, inter-processor communication, cache coherency, cache injection, and most importantly, data transfer. Processor complex interconnect bandwidth is at a premium and should be carefully allocated for a computer system to function. Allowing I/O writes to update cached items using cache injection would reduce memory latency but can hog processor complex bandwidth and starve other transfers detailed above. Similarly, injecting or updating data items into the cache hierarchy of a processor that are not needed by the processor can create cache pollution and directly affect application performance.

What is needed, therefore, is a way to manage cache injection using both I/O hub and I/O adapter resources for efficient use of processor complex interconnect bandwidth and to reduce cache pollution.

BRIEF SUMMARY OF THE INVENTION

Embodiments of the invention include a method for two-sided, dynamic cache injection control. The method includes generating an I/O transaction by an I/O adapter in response to receiving a request for the transaction. The transaction includes an ID field and a requested address. The adapter looks up the address in a cache translation table stored thereon, which includes mappings between addresses and corresponding address space identifiers (ASIDs). The adapter enters an ASID in the ID field when the requested address is present in the cache translation table. The adapter sends the transaction to one of an I/O hub and system chipset, which in turn, looks up the ID in a table stored thereon and injects the transaction into the processor complex when the ASID is present in the table, indicating that the ASID is actively running on a processor in the complex. The ASIDs are dynamically determined and set in the I/O adapter during execution of an application in the processor complex.

Additional embodiments include a system for two-sided, dynamic cache injection control. The system includes an input/output (I/O) adapter and a device in communication with the I/O adapter over an input/output (I/O) interconnect. The device includes one of an input/output (I/O) hub and a system chipset. The I/O adapter executes logic for generating an input/output (I/O) transaction, the I/O transaction including an ID field and a requested address. The logic further looks up the requested address in a cache translation table stored in the I/O adapter, the cache translation table including mappings between addresses and corresponding address space identifiers (ASIDs) for a storage location. The logic further includes entering an ASID in the ID field of the I/O transaction when, in response to the look up, the requested address is present in the cache translation table, the entered ASID mapped to the requested address. The logic also includes sending the I/O transaction including the ASID in the ID field to the device. The device executes logic for performing: looking up the ASID in a table stored on the device and injecting address and data from the I/O transaction into the processor complex when, in response to the look up in the table, the ASID is present in the table, indicating that the ASID is actively running on a processor in the processor complex. The ASIDs are dynamically determined and set in the I/O adapter during execution of an application in the processor complex.

Additional embodiments include a computer program product for two-sided, dynamic cache injection control. The computer program product includes a storage medium readable by a processing circuit and storing instructions for execution by the processing circuit for implementing a method. The method includes generating an I/O transaction by an I/O adapter in response to receiving a request for the transaction. The transaction includes an ID field and a requested address. The adapter looks up the address in a cache translation table stored thereon, which includes mappings between addresses and corresponding address space identifiers (ASIDs). The adapter enters an ASID in the ID field when the requested address is present in the cache translation table. The adapter sends the transaction to one of an I/O hub and system chipset, which in turn, looks up the ID in a table stored thereon and injects the transaction into the processor complex when the ASID is present in the table, indicating that the ASID is actively running on a processor in the complex. The ASIDs are dynamically determined and set in the I/O adapter during execution of an application in the processor complex.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments of the invention relate to processes for implementing two-sided, dynamic cache injection control. The two-sided, dynamic cache injection control provides the ability for an I/O adapter to work in tandem with an I/O hub or system chipset to determine whether to perform direct cache injection for I/O transactions based upon selective criteria and the most current, up-to-date information, as described further in FIGS. 1-5. Cache injection refers to a process by which data values, e.g., in a direct memory access (DMA) write transaction, are directly injected into a hierarchically organized cache system in a broadcast-type manner; that is, incoming traffic, e.g., from a network, is broadcast to each of the caches in the hierarchy, as opposed to the system memory. By performing cache injection, subsequent access to the data is quicker, thereby reducing latency associated with accessing the system memory. The cache with the broadcasted address then updates its value. The information is broadcast to each of the caches because the computer system's system chipset or I/O hub typically does not have knowledge of which cache has an I/O write address stored therein. This operation is performed for all addresses and associated data, since the I/O hub has no information regarding the cached addresses in the processor complex. Clearly, this process leads to considerable bandwidth waste, as 'inject'-able values are broadcast even for addresses not cached in any of the processor complex caches.

The two-sided, dynamic cache injection control processes described herein provide a means for both I/O adapter devices and I/O hubs or chipsets to work together to determine a cache injection policy based upon defined criteria and the most up-to-date information. In particular, for information that changes frequently, the I/O hub or system chipset may be better equipped to handle direct cache injection policies since, because it is closer to a processor complex, it has the most current information. Whereas, for information that does not frequently change (e.g., pinned addresses, pinned processes), the I/O adapter may be used to store such information without hampering the progress of cache injection even though it is further away from the processor complex. Furthermore, the I/O adapter can be used to 'filter' I/O transactions for the I/O hub. The I/O adapter can inject ID values for transactions corresponding to address ranges related to I/O pages in memory or running processes in the processor complex. The I/O hub can then simply use these identified transactions to inject addresses into the processor complex that actually reside in a processor's cache. This may be a prudent choice as the I/O hub is closest to the processor complex and can be updated directly with state of cache lines. This is especially useful for identifying patterns in payloads where the processing burden can be shared between the I/O adapter and I/O hub. The pattern can be identified on the I/O adapter and the ID can simply be used in the I/O hub for lookups without any pattern searching or matching in the I/O hub. As the I/O hub is closer to the processor complex, it can also preempt transactions that were selected for cache injection on the I/O adapter based on recent information. Similarly, all I/O adapters are attached to the I/O hub and the I/O hub may direct all transactions from a certain class of adapters, for example, storage and network adapters, to processor complex caches. This is because it has global knowledge of all adapters attached to it. The I/O hub can be used to store addresses that change their state from cached to uncached frequently and can be recorded in a table on the I/O hub. In comparison, the I/O adapter can be used to store addresses that change state from 'in memory' to 'swapped out' less frequently Turning now to FIG. 1, an exemplary system for implementing two-sided, dynamic cache injection control will now be described. The system of FIG. 1 relates to an SMP architecture in which a system memory 108 is coupled with a system chipset 106 or I/O hub (e.g., a system employing Intel® processors). The system includes an I/O adapter 102 (which, in turn, includes a processor and logic) coupled to the chipset 106 via a bi-directional I/O interconnect 104 (e.g., PCI Express). The chipset 106 is communicatively coupled to the system memory 108 (also referred to herein as main memory). The chipset 106 includes a processor and logic and is also coupled to a processor complex 110 over a front side bus (FSB) 114. The I/O adapter 102 reads/writes data between the chipset 106 and peripheral devices (not shown).

Figure 1:
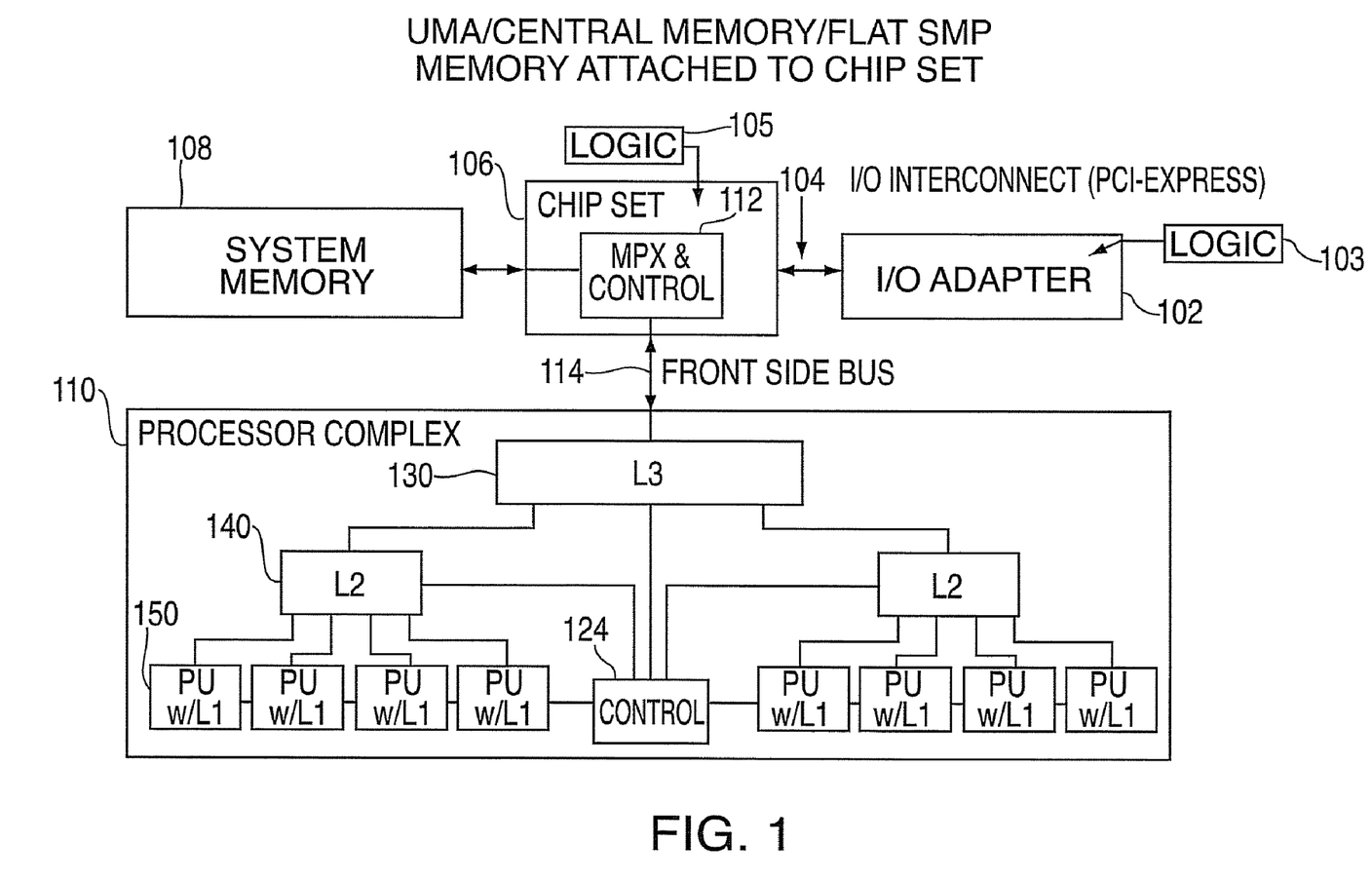
FIG. 1 is a symmetrical multiprocessor architecture (SMP) for use in implementing two-sided, dynamic cache injection control in accordance with an exemplary embodiment.

The processor complex 110 includes multiple processing units, each with a level 1 (L1) cache 150. In the embodiment shown in FIG. 1, the processor complex 110 also includes a level 2 (L2) cache 140 and level 3 (L3) cache 130. The levels 130, 140, and 150 of cache represent a storage hierarchy of the processor complex 110. L3 represents a highest cache level (highest memory latency), and L1 represents a lowest cache level (lowest memory latency) in the hierarchy. It will be understood that any number of cache levels may be implemented in order to realize the advantages of the invention. Three levels L1-L3 are provided for illustrative purposes only and are not to be construed as limiting in scope. In addition, as shown in FIG. 1 for illustrative purposes, multiple processing units (PUs) or groups of processing units may share a common Level 2 and Level 3 storage space in the cache hierarchy.

The processor complex 110 also includes a control unit 124 which manages the traffic (e.g., data transfers) associated with transactions occurring within the complex 110 with respect to the cache hierarchy L1-L3.

The chipset 106 may include a group of integrated circuits (chips) that work together to perform various tasks. In an exemplary embodiment, the chipset 106 includes a multiplexer (MPX) and controller 112 for directing the traffic associated with transactions occurring among the I/O adapter 102, the system memory 108, and the processor complex 110 (e.g., read and write transactions). While the embodiment described in FIG. 1 is directed to a chipset 106, it will be understood that other devices may be utilized in implementing the data transfer to memory processes (e.g., cards, boards, etc.).

As described above, conventional systems perform cache injection by broadcasting data values of a transaction to each of the caches in a hierarchically organized cache system. The two-sided, dynamic cache injection control processes described in these exemplary embodiments utilize logic 103 executing in the I/O adapter 102 (e.g., software/firmware), as well as logic 105 in the chipset 106 to selectively and dynamically determine cache injection policies with respect to the system memory 108 (or higher level cache L3), as shown e.g., by the solid line between the chipset 106 and system memory 108, as well as by the front side bus 114 between the MPX & Control 112 and the L3 cache 130.

Figure 2:
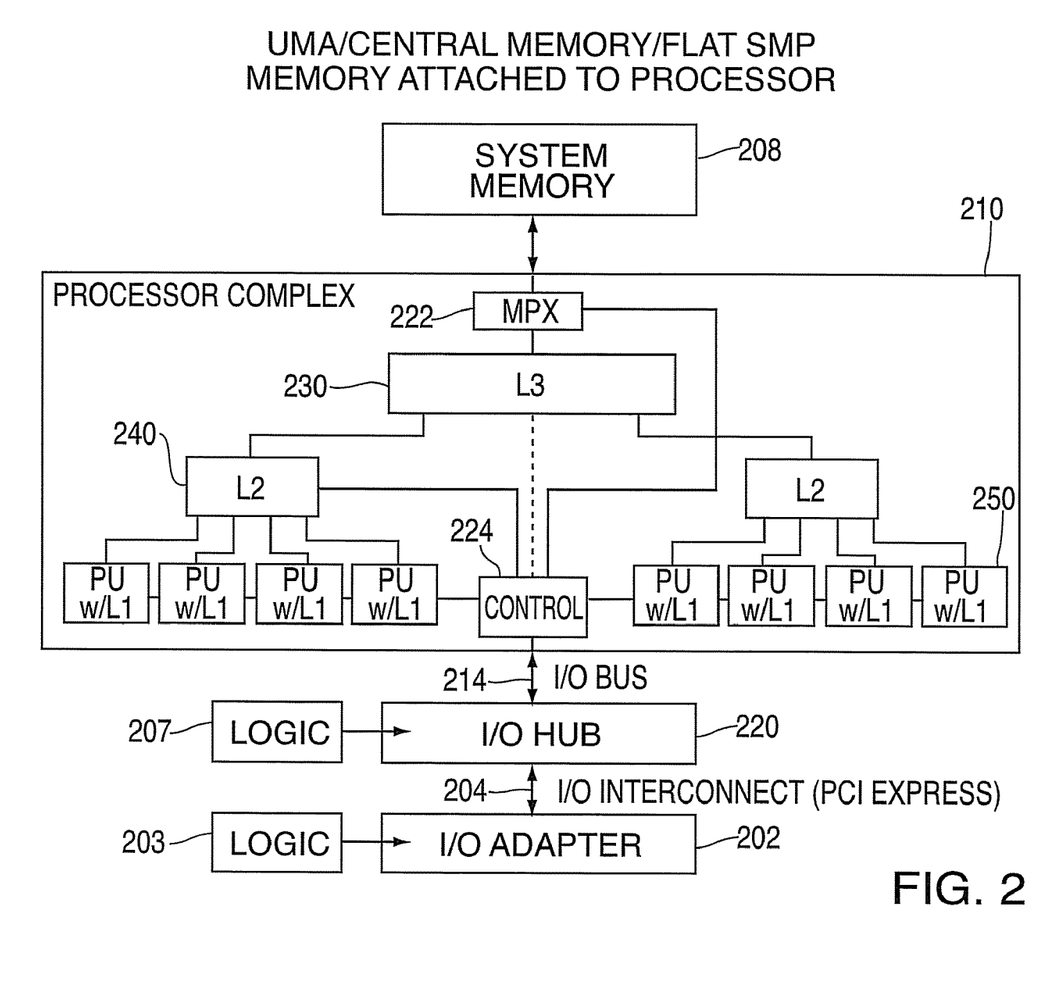
FIG. 2 is a symmetrical multiprocessor architecture (SMP) for use in implementing two-sided, dynamic cache injection control in accordance with another exemplary embodiment.

Turning now to FIG. 2, a system upon which the two-sided, dynamic cache injection control may be implemented in accordance with another exemplary embodiment will now be described. The system of FIG. 2 relates to an SMP architecture in which a system memory 208 is coupled with a processor complex 210 (e.g., a system employing AMD® processors or IBM® System z™ and System p™ processors). Various components of the system of FIG. 2 overlap in function with components described above in FIG. 1. To this extent, these components and/or functions will not be described in detail. The system of FIG. 2 includes an I/O adapter 202 in communication with an I/O hub 220 over an I/O interconnect 204 (e.g., PCIe). The I/O hub 220 is communicatively coupled to the processor complex 210 via an I/O bus 214. The processor complex 210, likewise, is communicatively coupled to the system memory 208 (also referred to as main memory). The processor complex 210 includes a cache hierarchy with three levels of cache, namely L1 250, L2 240, and L3 230. The I/O hub 220 communicates with the processor complex 210 via a control unit 224 which directs traffic between the I/O hub 220, the cache hierarchy, and the system memory 208 via a multiplexer 222.

The I/O adapter 202 reads/writes data to the processor complex 210 and the system memory 208 via the I/O interconnect 204, I/O hub 220, I/O bus 214 and MPX 222. For example, in a conventional cache injection process, the data transaction or request is generated in the I/O adapter 202 and distributed over the I/O interconnect 204 to the I/O hub 220 using, e.g., PCI Express protocols. The I/O hub 220 performs a translation (e.g., transforming the PCI Express protocols to those in which the I/O bus 214 will understand) and distributes the translated data over the I/O bus 214 to the control unit 224 where it is sent directly to the L3 cache 230. The two-sided, dynamic cache injection control processes of the exemplary embodiments utilize logic 203 executing on the I/O adapter 202 (e.g., software/firmware), as well as logic 207 executing on the I/O hub 220 to identify transactions that can be injected into the processor complex cache hierarchy.

Figure 3:
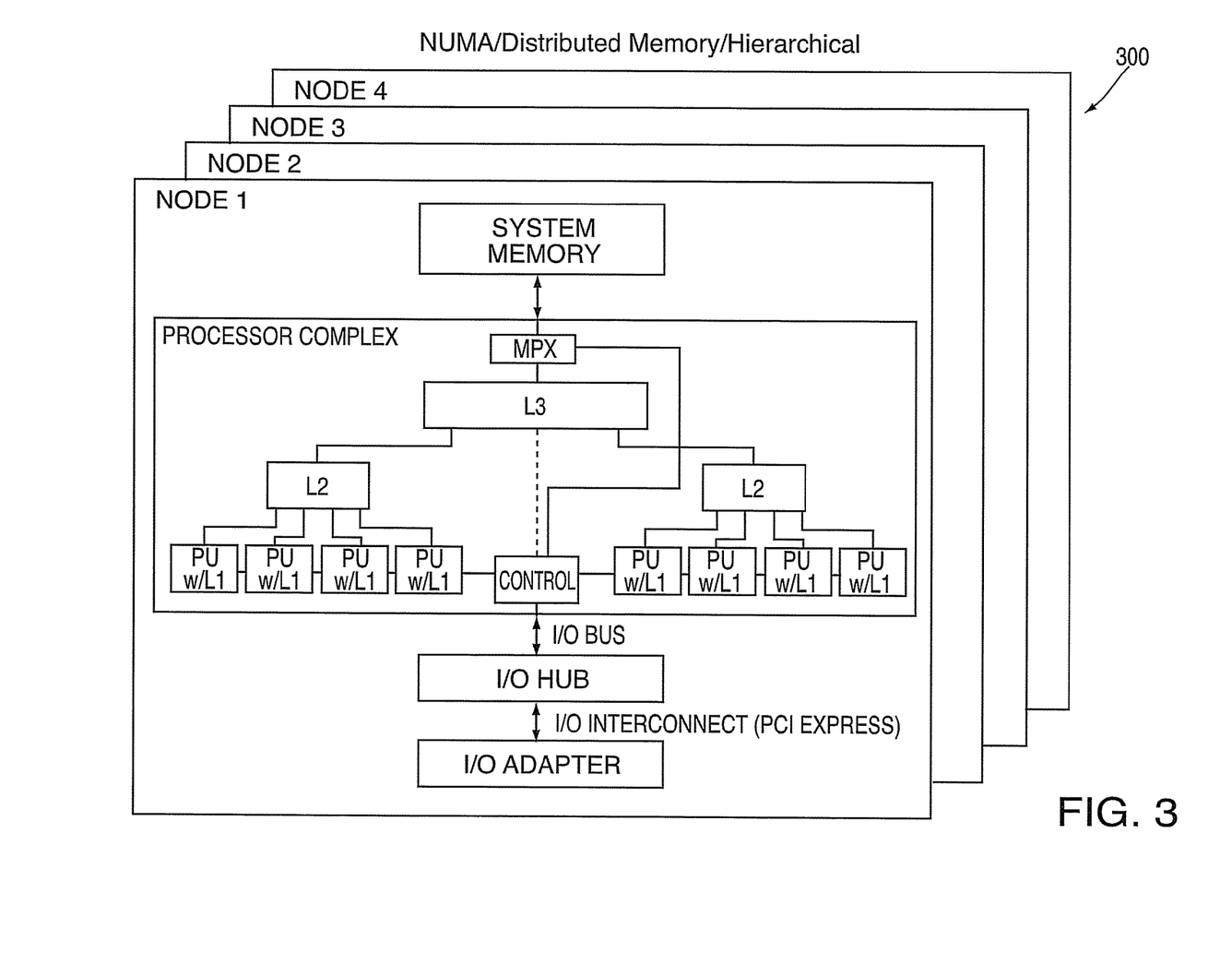
FIG. 3 is a non-uniform memory access (NUMA) architecture with distributed memory for use in implementing two-sided, dynamic cache injection control in accordance with yet another exemplary embodiment.

Turning now to FIG. 3, a non-uniform memory access (NUMA) architecture with distributed memory for use in implementing two-sided, dynamic cache injection control will now be described. The system of FIG. 3 includes multiple nodes 300 (Nodes 1-4), which communicate among one another for performing data transactions including the two-sided, dynamic cache injection control processes described herein. Each of the nodes 1-4 may include a multiplexer (MPX) (e.g., MPX 222) that steers data to system memory 208 or cache hierarchy in the processor complex 210. Keeping data values coherent in the caches may be implemented, e.g., using scalable directory-based cache coherency techniques or snoopy bus protocols. It will be understood that the direct cache injection management processes may be implemented over a system that includes multiple nodes in an SMP architecture of FIGS. 1 and 2, as well.

In an exemplary embodiment, the two-sided, dynamic cache injection control enables carriage of an identifier (ID) along with each data transaction (e.g., transaction burst). In the I/O interconnect 104/204, e.g., PCI Express, a transaction layer thereof generates header and data for the transaction. The transaction layer header carries this information for memory write PCI transactions. If the transaction does not include the ID and is sent to the chipset 106 of FIG. 1, the chipset 106 directs the entire transaction to the memory 108 using MPX 112 without causing any cache injection traffic in the processor complex 110. Cache coherence protocols may engage to cause any cache line invalidations for addresses cached in processor caches. This causes fewer resources to be used in the system and reduces the interconnect utilization of the processor complex 110. Likewise, if the ID is present in the I/O transaction, the system chipset 106 directs the I/O transaction to the cache hierarchy of the processor complex 110.

Alternatively, as shown in FIG. 2, if the transaction does not include the ID, when it reaches the controller 224 of FIG. 2, the I/O hub 220 directs the entire transaction to the memory 208 using MPX 222 without causing any cache injection traffic in the processor complex 210. This flow is represented in FIG. 2 as line 260. On the other hand, if the transaction does include the ID, the I/O hub 220 directs the transaction to the cache hierarchy of processor complex 210.

This process may be useful for various transaction types. For example, long data typically spans several cache lines. Alternatively, it may be useful to inject just the first-critical-cache-line (or first few cache lines) and write the rest of the long data to memory (or to higher order caches, such as L3 130/230). The long nature of the data will hide the startup access latency to memory.

Other transaction types that may benefit from this process include bulk data and non-shared data. Bulk data is data that spans several cache sizes, often gigabytes to terabytes of data. In such cases, cache injection is not necessary as the startup latency of cache access can be amortized over the entire transfer. For non-shared data that does not exhibit producer-consumer relationships or reader-writer access patterns between the I/O device and memory (or between processors), broadcasting injection data over the processor complex interconnect (e.g., 114/214) is wasteful. Instead, direct cache injection policies may be defined via the IDs, which determine whether to inject the transactions to cache or whether to steer the transactions to system memory.

Figure 4:
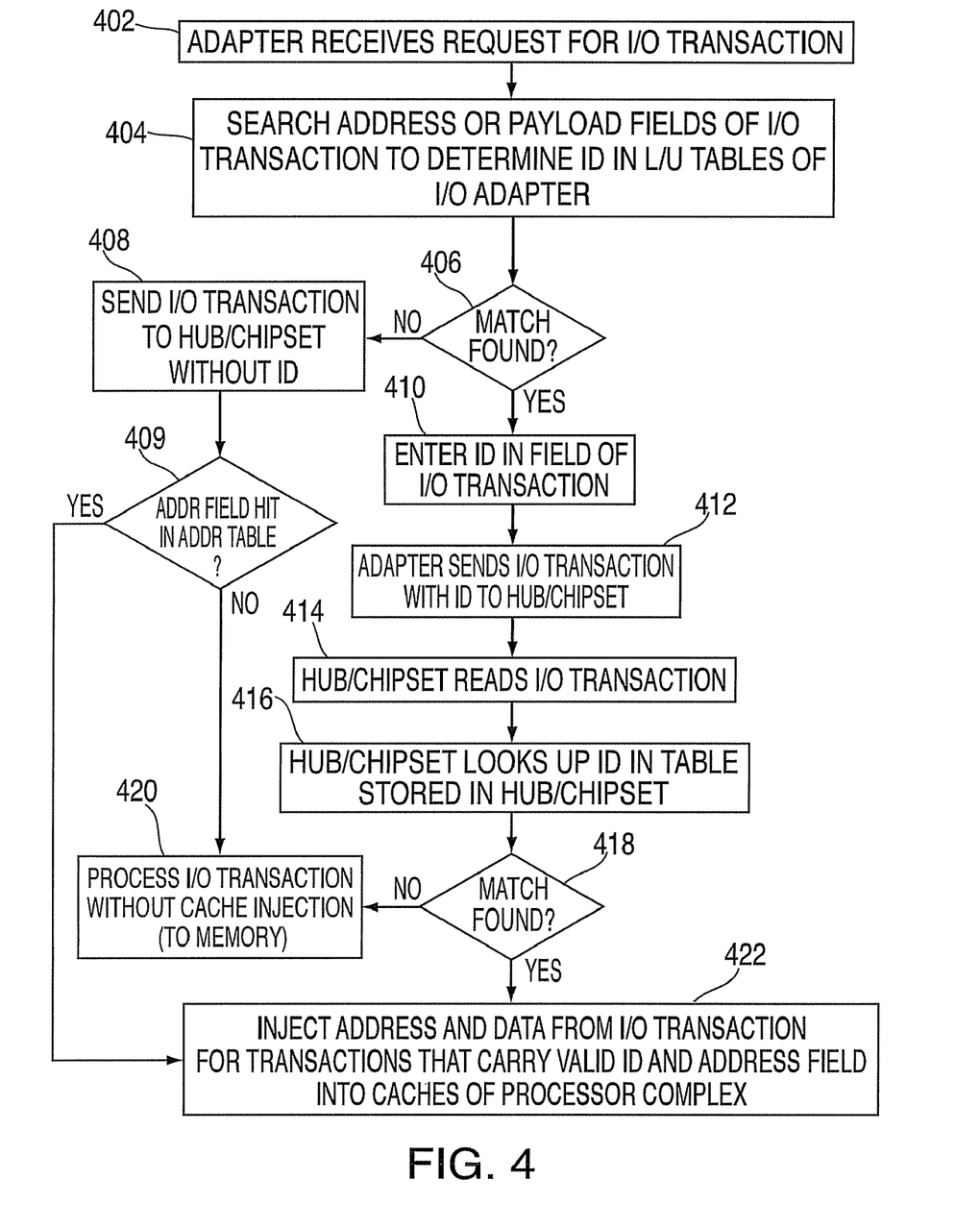
FIG. 4 is a flow diagram describing a process for implementing two-sided, dynamic cache injection control in accordance with an exemplary embodiment.
Figure 5:
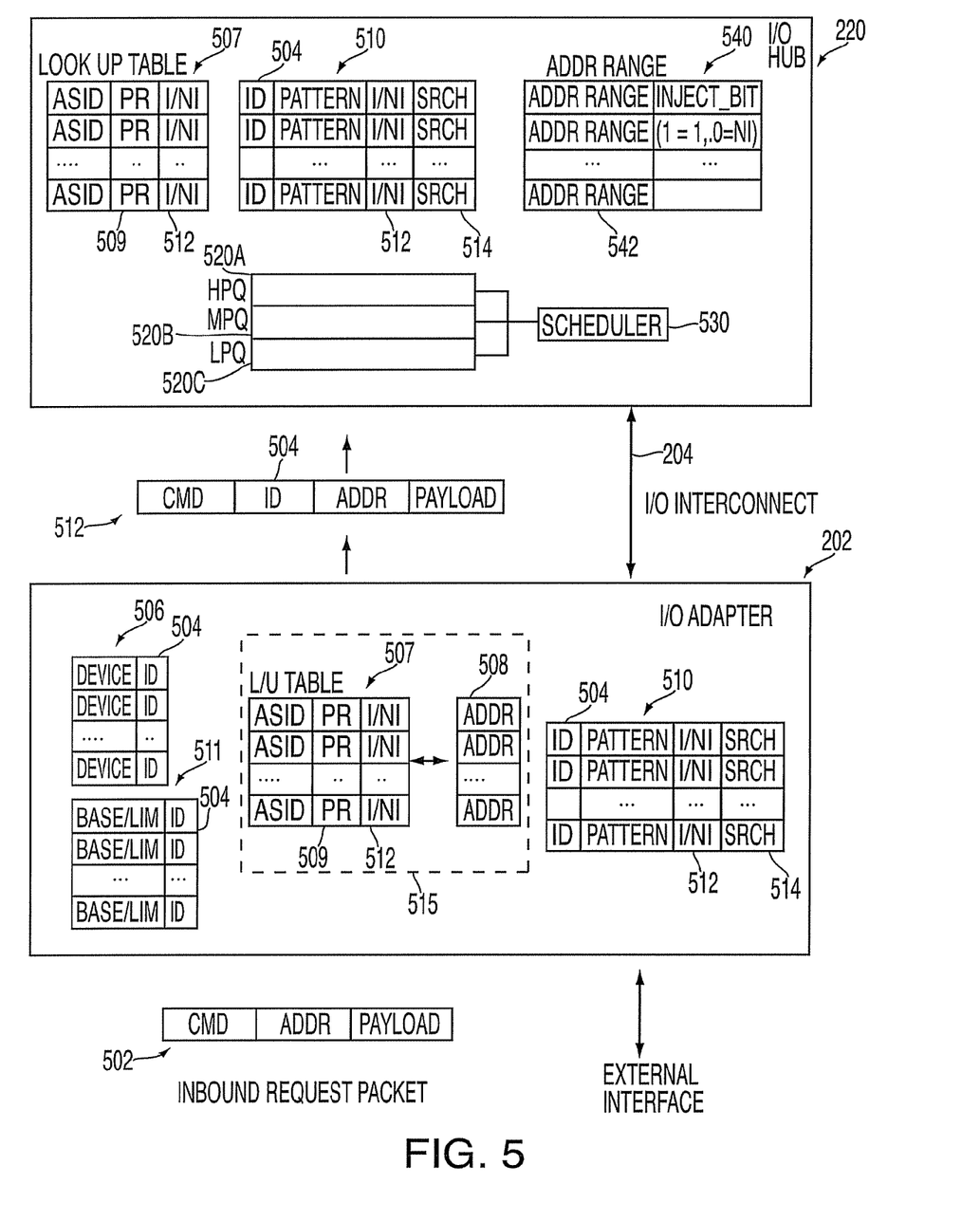
FIG. 5 is a block diagram describing components of an input/output (I/O) adapter and host system used in the system of FIG. 1 for implementing two-sided, dynamic cache injection control in accordance with an exemplary embodiment.

Turning now to FIGS. 4 and 5, a flow diagram describing a process for implementing the two-sided, dynamic cache injection control, as well as an I/O adapter and I/O hub for performing the two-sided, dynamic cache injection control will now be described. For illustrative purposes, the two-sided, dynamic cache injection control will be described with respect to the I/O adapter and I/O hub illustrated in FIG. 2. However, it will be understood that the processes described herein may be adapted for use in a system that utilizes a chipset as well (e.g., the system of FIG. 1).

At step 402, the I/O adapter 202 receives a request for an input/output (I/O) transaction (e.g., inbound request packet 502). The I/O adapter 202 generates an I/O transaction 512 which includes an identifier field (ID field) 504 and an address field ("ADDR"). The address field stores a requested address for implementing the I/O transaction 512. The I/O adapter 202 accesses a cache translation table 515 stored in the I/O adapter 202 and looks up the address in an address table 508 of the cache translation table 515 at step 404. The cache translation table 515 stores mappings between addresses and corresponding address space identifiers (ASIDs). The ASIDs, stored in a look up table 507, are mapped to corresponding addresses in the address table 508. The IDs may include an address range, a device identifier, or a pattern. An address space identifier (ASID) may be used for lookups in scenarios where processes of an application are "pinned" or statically scheduled to a set of CPUs of processor complex 110/210. The I/O pages of this application are also likely to be "pinned" in memory with I/O write addresses likely to be present in processor caches. The ASID may also be used in scenarios where "gang scheduled" applications are executed, i.e., they are usually run at the same time and which work cooperatively. This is a way to "tag" address spaces that remain in memory frequently and are not frequently swapped out by the operating system. There is a high probability that these address spaces have their pages in memory and might benefit from cache injection if corresponding addresses reside in cache.

At step 406, it is determined whether the address is present in the cache translation table 515. An application executing in the processor complex 210 may dynamically determine and set the ASIDs in the I/O adapter 202 at runtime. If the address is not present in the cache translation table 515, this means that the address is not currently in the cache hierarchy (e.g., L1-L3) or system memory 208 of the processor complex 210, in which case the I/O transaction 512 is not selected by the application for direct cache injection. In this instance, the I/O transaction 512 is sent to the I/O hub 220 with the ID field 504 empty at step 408. In doing so, the I/O hub 220 is instructed to store the transaction data in the system memory 208, as opposed to the processor complex 210, as described further in step 420.

If, however, the address is present in the cache translation table 515, an ASID corresponding to the address is entered into the ID field 504 of the I/O transaction 512 at step 410. The I/O adapter 202 sends the I/O transaction 512 to the I/O hub 220 over the I/O interconnect 204 at step 412. The I/O hub 220 reads the I/O transaction 512 at step 414 and looks up the ASID in a look up table 507 stored thereon at step 416. At step 418, it is determined whether the ASID is present in the look up table 507. If not, this means that the corresponding address for the ASID is no longer in the cache hierarchy. Thus, even though the I/O adapter 202 determined the presence of the address in the cache at step 406, the I/O hub 220 has the most current information since it is closest to the processor complex 210 and typically has its data updated before the I/O adapter 202 receives its updates. In this instance, the I/O hub 220 may pre-empt the direct cache injection issued via the ASID at step 410 and instead, process the I/O transaction 512 by steering the data in the transaction 512 to system memory 208 at step 420. In this manner, both the I/O adapter 202 and the I/O hub 220 work in tandem to dynamically determine, execute, and sometimes pre-empt cache injections (based upon the most up-to-date information) with respect to the processor complex 210, thereby minimizing bandwidth waste and eliminating excess cache pollution.

Likewise, if the ASID is present in the look up table 507 stored in the hub 220 at step 418, this means that the address is still currently active in the processor complex 210. In this instance, the I/O hub 220 injects the addresses and values of the I/O transaction 512 into the processor complex 210 that carries the ASID at step 422.

Turning back to step 408, if the ID field 504 in transaction 512 is not populated, I/O hub 220 can still use the ADDR field in transaction 512 to make an injection decision. A blank ID field might mean that the ASID or application process is not running in the processor complex 210 anymore but the address in the ADDR field might be a physical address now being used by a currently running application and in a cache. In this case (step 409), I/O hub 220 uses an address table 540 to lookup addresses that might be resident in cache and can benefit from injection. Address table 540 is updated with recent information from the processor complex 210 on cached and uncached addresses at step 422. Otherwise, the I/O hub 220 is instructed to store the transaction data in the system memory 208 at step 420.

The processes described above relate to ASIDs that are mapped to addresses via the cache translation table 515. However, the dual-sided, dynamic cache injection control processes may be implemented for other defined criteria as well, such as device identifiers, address ranges, and data patterns. For example, the I/O adapter 202 may include a device table 506 that includes a device identifier field and the ID field 504 which is used to select a particular device, or type of device for cache injection. In addition, the I/O adapter 202 may include an address range table 511, which includes a base and limit (e.g., low end of address and high end of address) and may be implemented using, e.g., associative lookup. Using the address table 511 for the comparison, if the address in the request 502 falls within limits of a base/limit in the address table 511, the I/O adapter 202 enters the ID in field 504 of table 511 into the ID field 504 of the I/O transaction 512. Alternatively, using the device ID table 506 for the comparison, if the device ID in the request 502 matches a device ID in the device ID table 506, the I/O adapter 202 enters the ID in field 504 of table 506 into the ID field 504 of the I/O transaction 512.

As indicated above, the lookups, or comparisons, may be performed by a processor of the processor complex 210 by selectively snooping for patterns in I/O transactions 512 of the I/O adapter 202. The processor may snoop for the patterns in the payloads ("PAYLOAD") of the transaction 502.

A table of payload patterns 510 is additionally stored on the I/O adapter 202. Payload patterns are strings that may occur in payload data ("PAYLOAD") of requests 502. This may facilitate steering transactions 512 to main memory 208 or caches of the processor complex 210 based on certain strings in application data that occur in the payload field of 502. The table of patterns 510 is used to search for a pattern in the transaction 502. If this search yields a positive outcome, the ID 504 from table 510 associated with the pattern can be used as the ID field for transaction 512. When transaction 512 reaches the I/O hub 220, the ID from transaction 512 can be used for a lookup in Table 510 of I/O hub 220. If the ID 504 is found in Table 510, the corresponding (Inject/No Inject) field 512 is looked up. Address and values from transaction 512 are injected into the caches of processor complex 210 if the (I/NI) field 512 of I/O hub 220 is set. It will be understood that this allows transaction 512 to be preempted (its injection decision reversed in effect) even though its ID field may be reset by I/O adapter 202. Furthermore, using table 510 on I/O hub 220 means that a search of the pattern does not have to be performed again on I/O hub 220 as the pattern has already been identified on I/O adapter 202. This allows processing to be cooperatively distributed between the I/O adapter 202 and I/O hub 220 and transaction 502 can still benefit from recent information available from the processor complex 210 at the I/O hub 220. In another embodiment of the present invention, transaction 512 can be populated with an ID 504 from tables 506, 507 or 511. When transaction 512 reaches the I/O hub 220, if any of the 'SEARCH' (1/0) fields 514 in table 510 are set, the payload of transaction 512 can be searched for corresponding patterns from the 'PATTERN' field and any injection decisions from I/O adapter 202 can be reversed.

Thus, the dual-sided, dynamic cache injection control processes further enable overriding by the I/O hub 220 of the settings or policies provided in the I/O adapter 202 under certain circumstances. For example, the search field 514 is provided in the pattern table 510 whereby, if set, the I/O hub 220 searches for patterns based upon, e.g., a device identifier. If a match is found in response to the search, the I/O hub 220 may override an existing cache injection setting or policy for a pattern for the corresponding device identifier.

In addition, the two-sided, dynamic cache injection control may include providing prioritized access to a processor complex interconnect. This may be implemented by (i) dynamically recording processor complex interconnect utilization, and (ii) by setting I/O transaction priorities in the I/O adapter 202 by an application using runtime or compile time data, whereby the I/O transactions 512 carry priority information from the I/O adapter 212 to the I/O hub 220 via, e.g., a priority field (PR) 509. The I/O transactions 512 in the hub 220 are queued in priority queues (e.g., high priority queue HPQ 520A, medium priority queue MPQ 520B, and low priority queue LPQ 520C) within the I/O hub 220, and the queued transactions 512 are provided with access to the processor complex 210 via a priority scheduler 530. Each of the I/O transactions 512 is stored along with an age counter (not shown). I/O transactions 512 with ages approaching memory latencies as determined by a threshold value via the age counter are dropped from storage and sent to main memory 208. Additionally, the I/O transactions 512 with lowest priority levels are dropped from storage first when the storage reaches an I/O hub 220 threshold memory limit. In an exemplary embodiment of the present invention, if a transaction 502 was identified by the I/O adapter 202 yielding the transaction 512 using ASIDs from table 507, it is highly likely that this ASID or process is currently running in the processor complex 210 but the address corresponding to the transaction 512 might not be in any cache. The benefits of cache injection for this transaction are purely speculative. If this transaction 512 reaches the I/O hub 220, it can be queued in the lower priority queues, i.e., one of MPQ 520B and LPQ 520C to reflect uncertainty. If the ADDR field in transaction 502 yields in a hit in an address field 542 of the address table 540, it means that this address is present in at least one processor's cache and can benefit from injection. In this case, transaction 512 is queued in high priority queue (BPQ) 520A as it has been ascertained that transaction 512 is present in at least one processor's cache.

Figure 6:
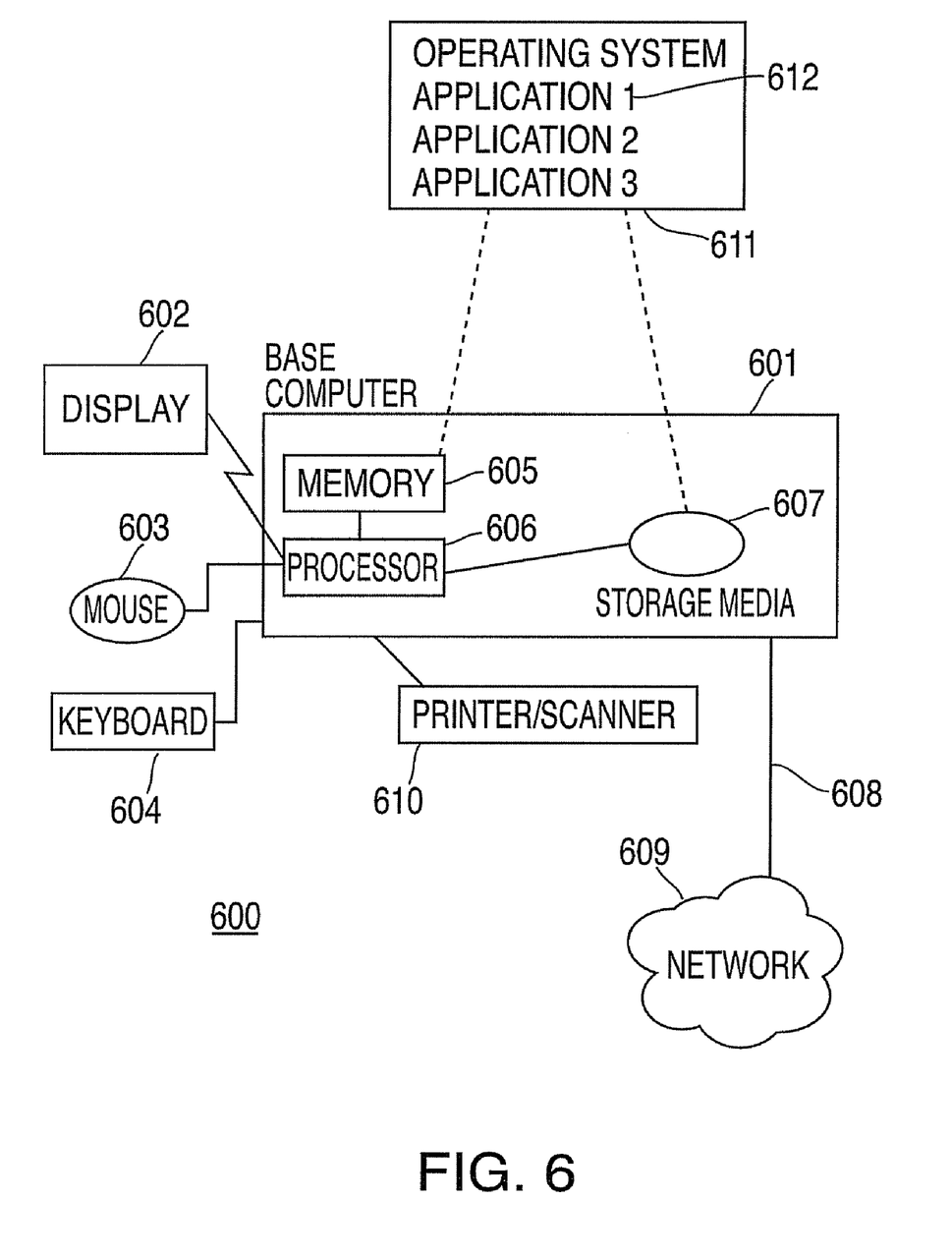
FIG. 6 is a workstation for implementing two-sided, dynamic cache injection control processes in accordance with an exemplary embodiment.

FIG. 6 illustrates a representative workstation or server hardware system in which the present invention may be practiced. The system 600 of FIG. 6 comprises a representative computer system 601, such as a personal computer, a workstation or a server, including optional peripheral devices. The workstation 601 includes one or more processors 606 and a bus employed to connect and enable communication between the processor(s) 606 and the other components of the system 601 in accordance with known techniques. The bus connects the processor 606 to memory 605 and long-term storage 607 which can include a hard drive, diskette drive or tape drive for example. The system 601 might also include a user interface adapter, which connects the microprocessor 606 via the bus to one or more interface devices, such as a keyboard 604, mouse 603, a printer/scanner 610 and/or other interface devices, which can be any user interface device, such as a touch sensitive screen, digitized entry pad, etc. The bus also connects a display device 602, such as an LCD screen or monitor, to the microprocessor 606 via a display adapter.

The system 601 may communicate with other computers or networks of computers by way of a network adapter capable of communicating 608 with a network 609. Example network adapters are communications channels, token ring, Ethernet or modems. Alternatively, the workstation 601 may communicate using a wireless interface, such as a CDPD (cellular digital packet data) card. The workstation 601 may be associated with such other computers in a Local Area Network (LAN) or a Wide Area Network (WAN), or the workstation 601 can be a client in a client/server arrangement with another computer, etc. All of these configurations, as well as the appropriate communications hardware and software, are known in the art.

Figure 7:
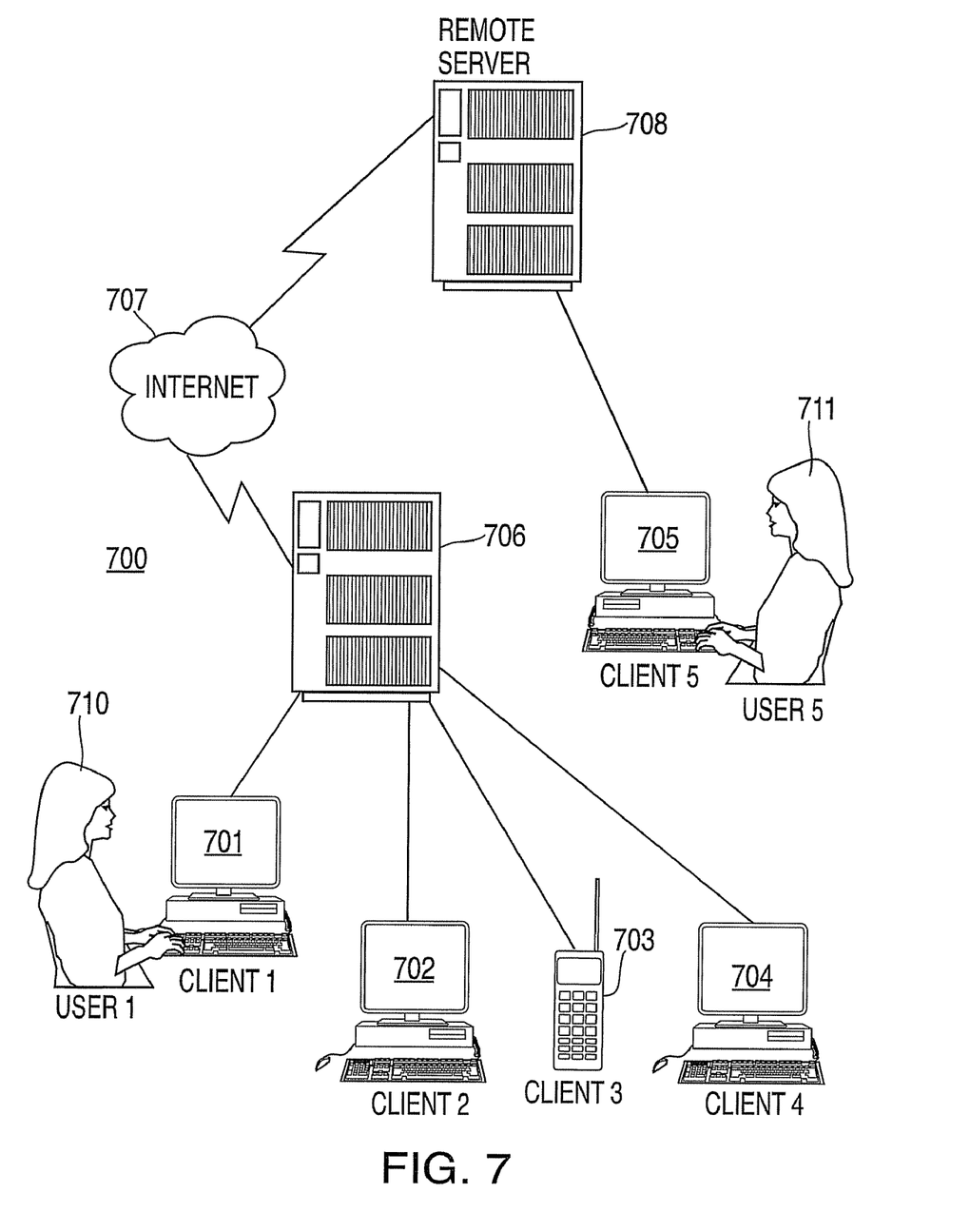
FIG. 7 is a data processing network for implementing two-sided, dynamic cache injection control processes in accordance with an exemplary embodiment.

FIG. 7 illustrates a data processing network 700 in which the present invention may be practiced. The data processing network 700 may include a plurality of individual networks, such as a wireless network and a wired network, each of which may include a plurality of individual workstations 601, 701, 702, 703, and 704. Additionally, as those skilled in the art will appreciate, one or more LANs may be included, where a LAN may comprise a plurality of intelligent workstations coupled to a host processor.

Still referring to FIG. 7, the network may also include mainframe computers or servers, such as a gateway computer (client server 706) or application server (remote server 708 which may access a data repository and may also be accessed directly from a workstation 705). The gateway computer 706 serves as a point of entry into each network 707. A gateway is needed when connecting one networking protocol to another. The gateway 706 may be preferably coupled to another network (the Internet 707 for example) by means of a communications link. The gateway 706 may also be directly coupled to one or more workstations 601, 701, 702, 703, and 704 using a communications link. The gateway computer may be implemented utilizing an IBM eServer zSeries® 600 Server available from IBM Corp.

Software programming code which embodies the present invention is typically accessed by the processor 606 of the system 601 from long-term storage media 607, such as a CD-ROM drive or hard drive. The software programming code may be embodied on any of a variety of known media for use with a data processing system, such as a diskette, hard drive, or CD-ROM. The code may be distributed on such media, or may be distributed to users 710, 711 from the memory or storage of one computer system over a network to other computer systems for use by users of such other systems.

Alternatively, the programming code 611 may be embodied in the memory 605, and accessed by the processor 606 using the processor bus. Such programming code includes an operating system which controls the function and interaction of the various computer components and one or more application programs 612. Program code is normally paged from dense storage media 607 to high-speed memory 605 where it is available for processing by the processor 606. The techniques and methods for embodying software programming code in memory, on physical media, and/or distributing software code via networks are well known and will not be further discussed herein.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for two-sided, dynamic cache injection control, comprising:

receiving a request for an input/output (I/O) transaction at an input/output (I/O) adapter, the I/O adapter performing:

generating the I/O transaction, the I/O transaction including an ID field and a requested address;

looking up the requested address in a cache translation table stored in the I/O adapter, the cache translation table including mappings between addresses and corresponding address space identifiers (ASIDs) for a storage location;

entering an ASID in the ID field of the I/O transaction when, in response to the look up, the requested address is present in the cache translation table, the entered ASID mapped to the requested address;

sending the I/O transaction including the ASID in the ID field to a device comprising one of an input/output (I/O) hub and a system chipset, the device performing:

looking up the ASID in a table stored on the device; and injecting the requested address and corresponding data from the I/O transaction into a cache hierarchy of a processor complex when, in response to the look up in the table, the ASID is present in the table, indicating that the address space corresponding to the ASID is actively running on a processor in the processor complex;

wherein the ASIDs are dynamically determined and set in the I/O adapter and the device during execution of an application in the processor complex.

2. The method of claim 1, further comprising:

sending the I/O transaction to the device without the ASID when, in response to looking up the requested address in the cache translation table, the requested address is not present in the cache translation table;

wherein sending the I/O transaction to the device without the ASID causes the device to store the data from the I/O transaction to system memory and not in the processor complex caches.

3. The method of claim 1, further comprising:

overriding the cache injection of the data to the processor complex and storing data in the I/O transaction to system memory in lieu of the processor complex when, in response to looking up the ASID in the table stored on the device, the ASID is not present in the table.

4. The method of claim 1, further comprising:

sending the I/O transaction to the device without the ASID when, in response to looking up the requested address in the cache translation table, the requested address is not present in the cache translation table;

wherein sending the I/O transaction to the device without the ASID causes the device to use an address field from the I/O transaction and lookup an address from the address field in the address table wherein, in response to the address being present in the address table, the address and the data from the I/O transaction are stored to the processor complex caches without storing the address and the data to system memory.

5. The method of claim 1, wherein the data in the ID field is a numeric value corresponding to at least one of:

a pattern;

an address range; and a device identifier.

6. The method of claim 1, wherein ID lookups are performed by the I/O adapter by selectively searching for patterns corresponding to IDs in inbound packets of the I/O adapter.

7. The method of claim 1, wherein ID lookups are performed by the device by selectively searching for patterns corresponding to IDs in I/O transactions of the I/O adapter.

8. The method of claim 1, further comprising providing prioritized access to the processor complex, comprising:

dynamically recording processor complex interconnect utilization in the device and by setting I/O transaction priorities in the I/O adapter by an application using runtime or compile time data, the I/O transactions carrying priority information from the I/O adapter to the device;

queuing the I/O transactions in the device in priority queues;

providing queued transactions with access to the processor complex via priority scheduler;

storing each of the I/O transactions along with an age counter;

dropping I/O transactions with ages approaching memory latencies as determined by a threshold value, the ages determined by the age counter by storing the I/O transactions to system memory; and dropping priority I/O transactions with lowest priority levels when storage reaches a device threshold memory limit by storing the priority I/O transactions with the lowest priority levels to system memory.

9. A system for two-sided, dynamic cache injection control, comprising:

an input/output (I/O) adapter; and a device in communication with the I/O adapter over an input/output (I/O) interconnect, the device comprising one of an input/output (I/O) hub and a system chipset;

wherein the I/O adapter executes logic for performing:

generating an input/output (I/O) transaction, the I/O transaction including an ID field and a requested address;

looking up the requested address in a cache translation table stored in the I/O adapter, the cache translation table including mappings between addresses and corresponding address space identifiers (ASIDs) for a storage location;

entering an ASID in the ID field of the I/O transaction when, in response to the look up, the requested address is present in the cache translation table, the entered ASID mapped to the requested address;

sending the I/O transaction including the ASID in the ID field to the device, the device executing logic for performing:

looking up the ASID in a table stored on the device; and injecting the requested address and corresponding data from the I/O transaction into a cache hierarchy of a processor complex when, in response to the look up in the table, the ASID is present in the table, indicating that the address space corresponding to the ASID is actively running on a processor in the processor complex;

wherein the ASIDs are dynamically determined and set in the I/O adapter and the device during execution of an application in the processor complex.

10. The system of claim 9, wherein the logic executing on the I/O adapter further performs:

sending the I/O transaction to the device without the ASID when, in response to looking up the requested address in the cache translation table, the requested address is not present in the cache translation table;

wherein sending the I/O transaction to the device without the ASID causes the device to store the data from the I/O transaction to system memory and not in the processor complex caches.

11. The system of claim 9, wherein the logic executing on the I/O hub further performs:

overriding the cache injection of the data to the processor complex and storing the data in the I/O transaction to system memory in lieu of the processor complex when, in response to looking up the ASID in the table stored on the device, the ASID is not present in the table.

12. The system of claim 9, wherein the logic executing on the I/O adapter and the device further performs:

sending the I/O transaction to the device without the ASID when, in response to looking up the requested address in the cache translation table, the requested address is not present in the cache translation table;

wherein sending the I/O transaction to the device without the ASID causes the device to use an address field from the I/O transaction and lookup an address from the address field in the address table wherein, in response to the address being present in the address table, the address and the data from the I/O transaction are stored to the processor complex caches without storing the address and the data to system memory.

13. The system of claim 9, wherein the data in the ID field is a numeric value corresponding to at least one of:

a pattern;
an address range; and
a device identifier.

14. The system of claim 9, wherein ID lookups are performed by the I/O adapter by selectively searching for patterns corresponding to IDs in inbound packets of the I/O adapter from an external source.

15. The system of claim 9, wherein ID lookups are performed by the device by selectively searching for patterns corresponding to IDs in I/O transactions of the I/O adapter.

16. The system of claim 9, further including logic executable thereon for providing prioritized access to the processor complex, the prioritized access including:

dynamically recording processor complex interconnect utilization by setting I/O transaction priorities in the I/O adapter by an application using runtime or compile time data, the I/O transactions carrying priority information from the I/O adapter to the device;

queuing the I/O transactions in the device in priority queues;

providing queued transactions with access to the processor complex via priority scheduler;

storing each of the I/O transactions along with an age counter;

dropping I/O transactions with ages approaching memory latencies as determined by a threshold value, the ages determined by the age counter by storing the I/O transactions to system memory; and dropping priority I/O transactions with lowest priority levels when storage reaches a device threshold memory limit by storing the priority I/O transactions with the lowest priority levels to system memory.

17. A computer program product for data transfer to memory over an input/out (I/O) interconnect, the computer program product comprising:

a storage medium readable by a processing circuit and storing instructions for execution by the processing circuit for implementing a method, the method comprising:

receiving a request for an input/output (I/O) transaction at an input/output (I/O) adapter, the I/O adapter performing:

generating the I/O transaction, the I/O transaction including an ED field and a requested address;

looking up the requested address in a cache translation table stored in the I/O adapter, the cache translation table including mappings between addresses and corresponding address space identifiers (ASIDs) for a storage location;

entering an ASID in the ID field of the I/O transaction when, in response to the look up, the requested address is present in the cache translation table, the entered ASID mapped to the requested address;

sending the I/O transaction including the ASID in the ID field to a device comprising one of an input/output (I/O) hub and a system chipset, the device performing:

looking up the ASID in a table stored on the device; and injecting the requested address and corresponding data from the I/O transaction into a cache hierarchy of a processor complex when, in response to the look up in the table, the ASID is present in the table, indicating that the address space corresponding to the ASID is actively running on a processor in the processor complex;

wherein the ASIDs are dynamically determined and set in the I/O adapter and the device during execution of an application in the processor complex.

18. The computer program product of claim 17, further comprising instructions for implementing:

sending the I/O transaction to the device without the ASID when, in response to looking up the requested address in the cache translation table, the requested address is not present in the cache translation table;

wherein sending the I/O transaction to the device without the ASID causes the device to store the data from the I/O transaction to system memory and not in the processor complex caches.

19. The computer program product of claim 17, further comprising instructions for implementing:

overriding the cache injection of the data to the processor complex and storing data in the I/O transaction to system memory in lieu of the processor complex when, in response to looking up the ASID in the table stored on the device, the ASID is not present in the table.

20. The computer program product of claim 17, further comprising instructions for implementing:

sending the I/O transaction to the device without the ASID when, in response to looking up the requested address in the cache translation table, the requested address is not present in the cache translation table;

wherein sending the I/O transaction to the device without the ASID causes the device to use an address field from the I/O transaction and lookup an address from the address field in the address table wherein, in response to the address being present in the address table, the address and the data from the I/O transaction are stored to the processor complex caches without storing the address and the data to system memory.

* * * * *